United States Patent
Golden et al.

(10) Patent No.: US 12,312,279 B2
(45) Date of Patent: May 27, 2025

(54) SILICA-RICH BARRIER COATINGS

(71) Applicant: Rolls-Royce Corporation, Indianapolis, IN (US)

(72) Inventors: Robert Alexander Sean Golden, Noblesville, IN (US); Matthew T. Kush, Martinsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 122 days.

(21) Appl. No.: 17/129,039

(22) Filed: Dec. 21, 2020

(65) Prior Publication Data

US 2021/0221749 A1 Jul. 22, 2021

Related U.S. Application Data

(60) Provisional application No. 62/953,369, filed on Dec. 24, 2019.

(51) Int. Cl.
| | | |
|---|---|---|
| *C04B 41/50* | (2006.01) | |
| *C04B 41/00* | (2006.01) | |
| *C04B 41/45* | (2006.01) | |
| *C04B 41/86* | (2006.01) | |

(52) U.S. Cl.
CPC ........ *C04B 41/5022* (2013.01); *C04B 41/009* (2013.01); *C04B 41/4533* (2013.01); *C04B 41/86* (2013.01)

(58) Field of Classification Search
CPC .............. C04B 41/009; C04B 41/4533; C04B 41/5022; C04B 41/86
See application file for complete search history.

(56) References Cited

U.S. PATENT DOCUMENTS

| | | | |
|---|---|---|---|
| 9,890,089 B2 | 2/2018 | Kirby et al. | |
| 2006/0014029 A1* | 1/2006 | Saak | C04B 41/52 |
| | | | 428/446 |
| 2009/0162533 A1 | 6/2009 | Kirby et al. | |
| 2010/0159150 A1* | 6/2010 | Kirby | C04B 41/009 |
| | | | 427/419.7 |

(Continued)

FOREIGN PATENT DOCUMENTS

| | | |
|---|---|---|
| EP | 3156629 A1 | 5/2017 |
| EP | 3199507 A1 | 8/2017 |

OTHER PUBLICATIONS

Response to Extended Search Report dated Jan. 21, 2021, from counterpart European Application No. 20209506.3, filed Dec. 15, 2021, 49 pp.

(Continued)

*Primary Examiner* — Nathan H Empie

(74) *Attorney, Agent, or Firm* — Shumaker & Sieffert, P.A.

(57) ABSTRACT

In some examples, a method including depositing a plurality of particles on a ceramic or ceramic matrix composite (CMC) substrate to form a barrier coating on the ceramic or CMC substrate, the plurality of particles including a silica-rich rare earth (RE) disilicate material and a second material, wherein the silica-rich RE disilicate material includes excess silica compared to a stoichiometric RE disilicate material, wherein the barrier coating includes a first domain including (Continued)

the silica-rich RE disilicate material and a second phase, the second phase being disposed at grain boundaries, splat boundaries, or both of the barrier coating.

19 Claims, 5 Drawing Sheets

(56) References Cited

U.S. PATENT DOCUMENTS

| | | | |
|---|---|---|---|
| 2011/0027470 A1* | 2/2011 | Kirby | C04B 41/89 427/142 |
| 2011/0256411 A1* | 10/2011 | Courcot | C04B 41/009 428/446 |
| 2013/0122259 A1* | 5/2013 | Lee | C04B 41/5024 428/164 |
| 2016/0003063 A1* | 1/2016 | Rosenzweig | C04B 41/009 60/753 |
| 2016/0108510 A1* | 4/2016 | Kirby | C23C 4/02 501/133 |
| 2017/0130313 A1* | 5/2017 | Gold | C23C 14/32 |
| 2017/0218506 A1 | 8/2017 | Lee et al. | |
| 2017/0247787 A1 | 8/2017 | Saha et al. | |
| 2018/0370862 A1* | 12/2018 | Kirby | C04B 41/52 |

OTHER PUBLICATIONS

Olson et al., "Local Thermal Conductivity Measurement to Determine the Fraction of α-Cristobalite in Thermally Grown Oxide for Aerospace Applications," Scripta Materialia, vol. 177, Mar. 1, 2020, pp. 214-217.

Fielitz et al., "Secondary Ion Mass Spectroscopy Study of Oxygen-18 Tracer Diffusion in 2/1-Mullite Single Crystals", Journal of the American Ceramic Society, vol. 84, No. 12, Dec. 2001, pp. 2845-2848.

Haneda et al., "Oxygen Diffusion in Single Crystal Yttrium Aluminum Garnet", Journal of Crystal Growth, vol. 68, No. 2, Sep. 2, 1984, pp. 581-588.

Lee et al., "Yb2Si2O7 Environmental Barrier Coatings with Reduced Bond Coat Oxidation Rates via Chemical Modifications for Long Life", Journal of the American Ceramic Society, vol. 102, No. 3, Mar. 2019, pp. 1507-1521.

Extended Search Report for counterpart application EP20209506.3 dated Jan. 21, 2021, 7 pp.

* cited by examiner

SILICA-RICH BARRIER COATINGS

This application claims the benefit of U.S. Provisional Patent Application No. 62/953,369, filed Dec. 24, 2019, the entire content of which is incorporated herein by reference.

TECHNICAL FIELD

The disclosure relates to barrier coatings, in particular, barrier coatings used for high temperature components.

BACKGROUND

The components of gas turbine engines operate in severe environments. For example, the high-pressure turbine airfoils exposed to hot gases in commercial aeronautical engines typically experience surface temperatures in excess of 1000° C. Components of high-temperature mechanical systems may include a superalloy substrate, a ceramic substrate, or a ceramic matrix composite (CMC) substrate. In many examples, the substrates may be coated with one or more coatings to modify properties of the surface of the substrate. For example, superalloy, ceramic, or CMC substrates may be coated with a thermal barrier coating to reduce heat transfer from the external environment to the substrate, an environmental barrier coating to reduce exposure of the substrate to environmental species, such as oxygen, water vapor, or Calcium-Magnesium-Alumino-Silicate (CMAS) containing materials, an abradable coating to improve a seal between the substrate and an adjacent component, or combinations thereof.

SUMMARY

The disclosure describes example barrier coatings, for example, environmental barrier coatings (EBCs), thermal barrier coatings (TBCs), or abradable coatings, and techniques and systems for manufacturing barrier coatings.

In some examples, the disclosure relates to a method comprising depositing a plurality of particles on a ceramic or ceramic matrix composite (CMC) substrate to form a barrier coating on the ceramic or CMC substrate, the plurality of particles including a silica-rich rare earth (RE) disilicate material and a second material, wherein the silica-rich RE disilicate material includes excess silica compared to a stoichiometric RE disilicate material, wherein the barrier coating includes a first domain including the silica-rich RE disilicate material and a second phase, the second phase being disposed at grain boundaries, splat boundaries, or both of the barrier coating.

In some examples, the disclosure relates to an article comprising a ceramic or ceramic matrix composite (CMC) substrate; and a barrier coating on the substrate, the barrier coating comprising a first domain including a rare earth (RE) disilicate material and excess silica compared to a stoichiometric RE disilicate, and a second phase formed by interaction of a second material with at least a portion of the excess silica, wherein the second phase is disposed at grain boundaries, splat boundaries, or both of the barrier coating.

The details of one or more examples are set forth in the accompanying drawings and the description below. Other features, objects, and advantages will be apparent from the description and drawings, and from the claims.

DETAILED DESCRIPTION

Figure 1:
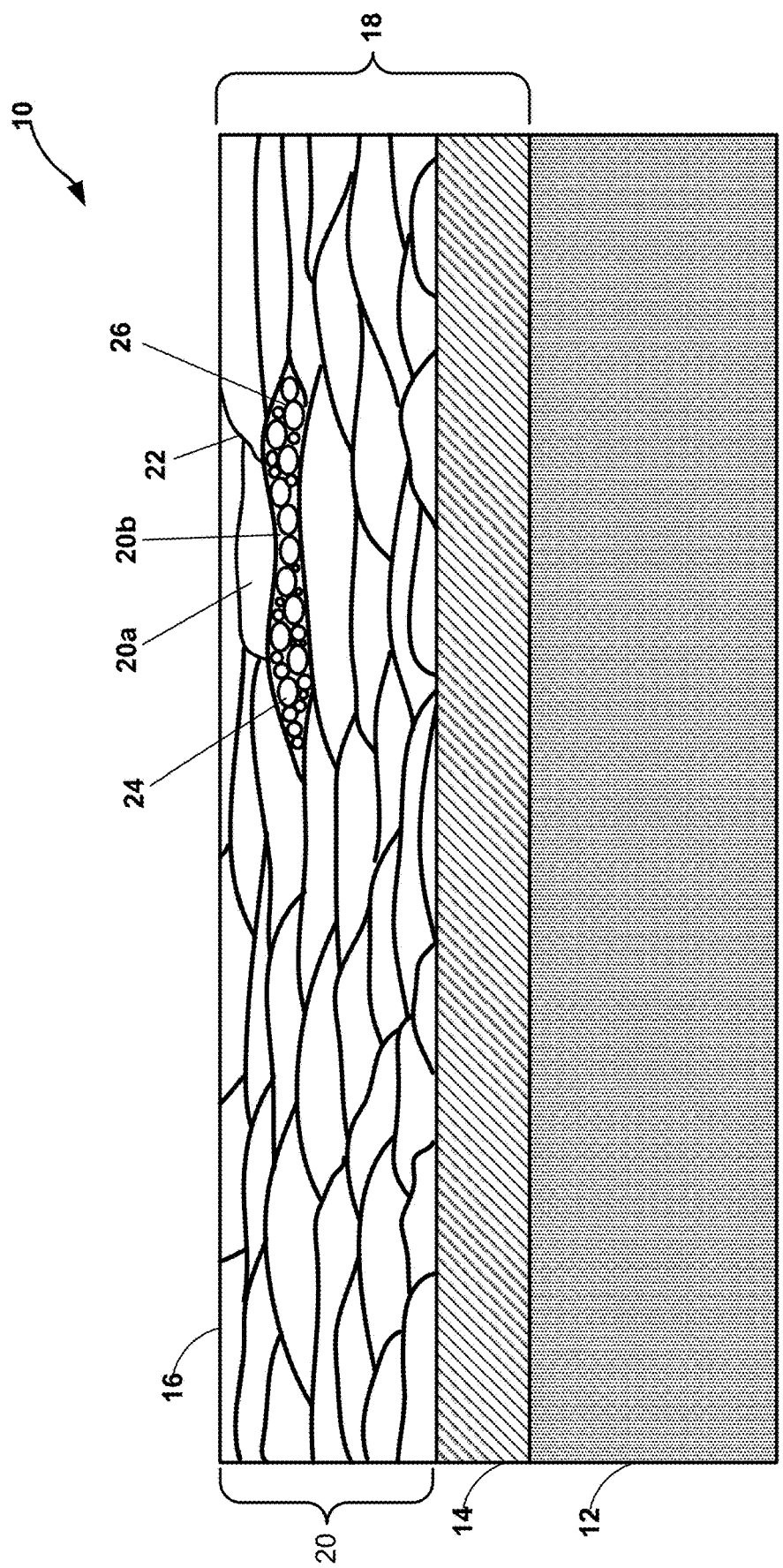
FIG. 1 is a conceptual diagram illustrating a cross-sectional view of an example article including an example barrier coating on a substrate.

The disclosure generally describes example barrier coatings and techniques for manufacturing barrier coatings. In some examples, a coating system including such a barrier coating (and other coatings such as bond coatings, environmental barrier coatings (EBCs), and/or abradable coatings) may be formed on a substrate, such as a ceramic or ceramic matrix composite substrate (e.g., a SiC based CMC substrate) for use in high temperature mechanical systems. Example high temperature mechanical systems may include gas turbines that operate in high temperature environments.

In the context of gas turbine engines, components including a ceramic or CMC may include an EBC formed on the substrate and optional bond coat (e.g., silicon bond layer) to provide environmental protection to the substrate during operation of the gas turbine engine in a high temperature environment. For example, the EBC may provide increased protection against environmental species, such as oxygen, water vapor, or Calcium-Magnesium-Alumino-Silicate (CMAS) containing materials.

In some examples, a coating system may include a ytterbium disilicate+$Al_2O_3$ EBC and a ytterbium disilicate abradable coating applied to the substrate and silicon bond coat via a thermal spray process. The abradable coating may have a higher porosity than the EBC to allow for the abrasion of the abradable coating during operation of the gas turbine engine. The EBC and abradable coating may each include stoichiometric ytterbium disilicate.

In some examples, during the operational life of the components, a $SiO_2$ thermally grown oxide (TGO) can form on a SiC CMC substrate and/or bond coat layer. For example, a TGO layer may result from the transport of oxidants, such as water vapor and/or oxygen) through a coating system including an EBC, which interacts with silicon in the bond coat layer and/or CMC substrate. The interaction oxidizes the silicon to form silica, which forms the TGO layer. After the TGO layer reaches a critical thickness and number of thermal cycles, the TGO layer may crack and spall the coating system (e.g., as a result of a phase transformation from amorphous to crystalline phase), which may lead to undesired results.

To address the transport of oxidants through an EBC, the density of the EBC may be increased to limit the TGO growth. In some examples, the density of an EBC may be increased by tailoring the thermal spraying process. However, during thermal spraying of a ytterbium disilicate material such as described above to form an EBC and/or abradable coating, $SiO_2$ may volatilize from the ytterbium disilicate which may result in an EBC and abradable coating with varying amounts of ytterbium monosilicate. The resulting EBC may cause a relatively high coefficient of thermal expansion (CTE) mismatch between the bond layer and/or CMC substrate due to the presence of more ytterbium monosilicate and greater residual stress. These undesirable side effects may limit the life of the coating system. Furthermore, even with a dense EBC having a relatively low porosity (e.g., about 5% or less), oxidant transport may occur primarily along grain boundary and/or splat boundary pathways.

In accordance with examples of this disclosure, a coating system may be formed on a ceramic or CMC substrate that includes a silica-rich rare earth (RE) barrier coating, e.g., in addition to an EBC and/or abradable coating layer(s). The barrier coating may be formed, e.g., by thermal spraying a silica-rich rare earth (RE) disilicate material with one or more additional materials onto a substrate (e.g., directly onto the substrate or bond layer on the substrate). The silica-rich disilicate material (also referred to as a hyper-RE disilicate material, such as hyper-ytterbium disilicate) may include excess silica (greater than 66.6 mol % $SiO_2$) compared to stoichiometric RE disilicate. The silica-rich RE disilicate may include a single cation RE disilicate (compared to having multiple RE type cations). The additional material(s) of the barrier coating may include one or more dopants and/or additives. As will be described below, in some examples, the chemistry and amount of additional material may be specifically added to increase the coatings hermeticity using one or more mechanisms. Example additional materials may include $Al_2O_3$, $Fe_2O_3$, $Fe_3O_4$, $RE_2O_3$ (where RE includes all rare earth element(s), Y and Sc), mullite, $RE_3Al_5O_{12}$ (e.g. ytterbium alimunina garnet (YbAG) or yttrium aluminum garnet YAG), MgO, $LiREO_2$ (where RE is a rare earth element), and/or CaO. In some examples, the additional materials may be selected because they react with a silica-rich RE disilicate and/or each other to form stable intergranular and/or intersplat phases, sinter (densify) the barrier coating, and/or modify TGO structure. One or all of these may increase the hermeticity of the coating. In one example, the additional material of $LiREO_2$ acts a sintering aid. The RE element in $LiREO_2$ may include at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

Suitable techniques other than thermal spraying may be employed to form the barrier coating, such as, slurry, sol-gel, tape cast, electron beam physical vapor deposition (EB-PVD), directed vapor deposition (DVD), electrophoretic deposition (EPD), and chemical vapor deposition (CVD). Examples of thermal spraying may include air plasma spraying (APS), suspension plasma spraying (SPS), high velocity oxygen fuel (HVOF) spraying, very low pressure plasma spraying (VLLPS), and plasma spray-physical vapor deposition (PS-PVD).

In some examples, during thermal spraying or other deposition processes, some amount of $SiO_2$ from the silica-rich RE disilicate may be lost. Starting with a powder that is silica-rich RE disilicate may result in a coating that has an average composition greater than 66.6 mol % $SiO_2$ after spraying. Overall this may reduce the CTE mismatch with the bond layer and/or underlying substrate. While there may be a small amount of RE monosilicate in the barrier coating after spraying but over time (e.g., hundreds or thousands of hours) at high temperatures the coating will equilibrate and the barrier coating may be left with a RE disilicate that contains excess $SiO_2$. With the addition of dopants or other additional materials like described herein, the additional materials (e.g. $Al_2O_3$) may react with the excess $SiO_2$ to form new phases that slow oxidant ingress.

The barrier coating formed from the thermal spraying of the silica-rich RE disilicate material with one or more additional materials may limit or otherwise reduce TGO growth rates in a coated article. In some examples, the coating chemistry for the barrier coating may allow for a barrier coating that is more hermetic than a stoichiometric or silica-lean (hypo) RE disilicate, e.g., by slowing the diffusion of oxidants (e.g., water vapor and/or oxygen) along fast transport pathways such as grain boundaries and/or splat boundaries of the coating. In some examples, oxidant transport along grain and splat boundaries may be slowed by the presence of an intergranular and/or intersplat $SiO_2$, $Al_2O_3$, $Fe_2O_3$, $Fe_3O_4$, $RE_2O_3$, mullite, $RE_3Al_5O_{12}$ and/or other additional material containing phase. For example, with $Al_2O_3$ as the additional phase, oxidant transport along grain and splat boundaries may be slowed by the presence of an intergranular and/or intersplat $SiO_2$ (e.g., from the silica-rich RE disilicate) and/or $Al_2O_3$ containing phase. The intergranular and/or intersplat phase may be amorphous or crystalline. In some examples, the intergranular and/or intersplat phase may interact (e.g., react) with the silica-rich RE disilicate and/or dopants to form a new stable crystalline phase (e.g. $SiO_2+Al_2O_3$=mullite). In some examples, the additional material may react with the silica-rich RE disilicate to form a intergranular and/or intersplat phase and/or the additional material may react with other additional material to form an intergranular and/or intersplat phase. Crystalline intergranular and/or intersplat phases (e.g., of mullite and $RE_3Al_5O_{12}$) may slow oxidant transport as they have sufficiently low oxygen diffusion coefficients that range from about 10-14 to about 10-16 at 1300 degrees Celsius (C). These phases may also be present within the RE disilicate matrix and can donate their metal cations to the amorphous intergranular and/or intersplat phase or $SiO_2$ TGO. These cations may modify the glass structure and further limit the transport of oxidants.

In addition to enabling the formation of amorphous and crystalline intergranular and/or intersplat phases, the additional material (e.g., $Al_2O_3$, $Fe_2O_3$, $Fe_3O_4$ and $Y_2O_3$) may act as sintering aids to densify the coating thereby increasing its hermeticity. This coating chemistry may also offer one or more additional benefits over a stoichiometric or $SiO_2$-lean (hypo) RE disilicate. For example, the "hermetic" barrier coating may have a better CTE match to a SiC CMC and/or silicon bond coat and the amorphous intergranular and/or intersplat phases may offer strain relief. Both of these attributes improve the coating systems ability to remain adhered to the substrate and/or bond coat during service.

Coatings systems including a silica-rich RE disilicate barrier coating in accordance with the disclosure may also include one or more additional layers such as EBC and/or abradable coating layers. For example, the stability of a silica-rich RE disilicate barrier coating in high velocity water vapor may be poor, e.g., since the coating chemistry is based on a $SiO_2$-rich RE disilicate and there may be $SiO_2$ and/or $Al_2O_3$ containing amorphous or crystalline phases along intergranular and/or intersplat boundaries. Therefore, an additional coating layer or layers may be applied on top of the silica-rich RE disilicate barrier coating layer to limit its reaction with high velocity water vapor.

Figure 4:
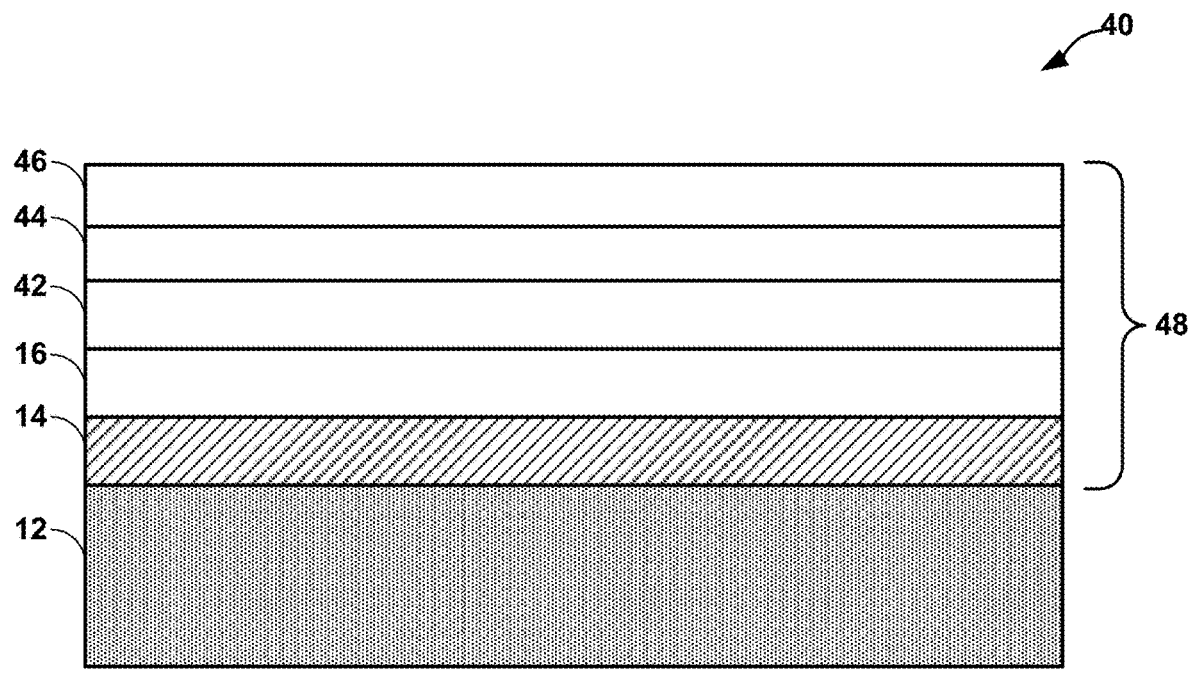
FIGS. 4-6 are conceptual diagrams illustrating cross-sectional views of other example articles including an example barrier coating on a substrate.
Figure 5:
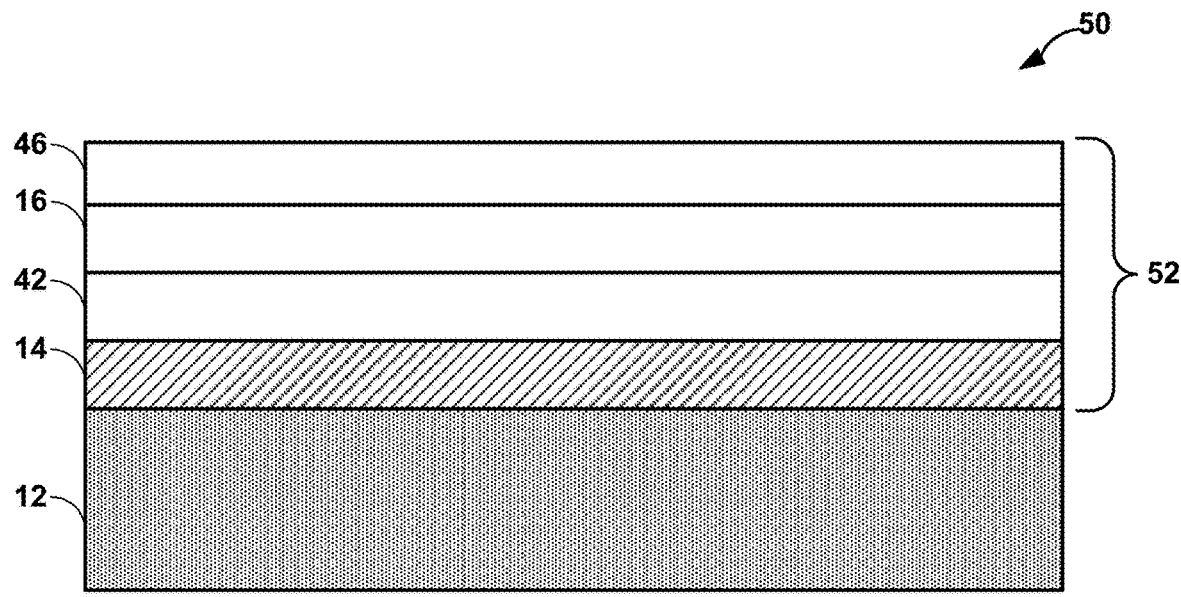
Figure 6:
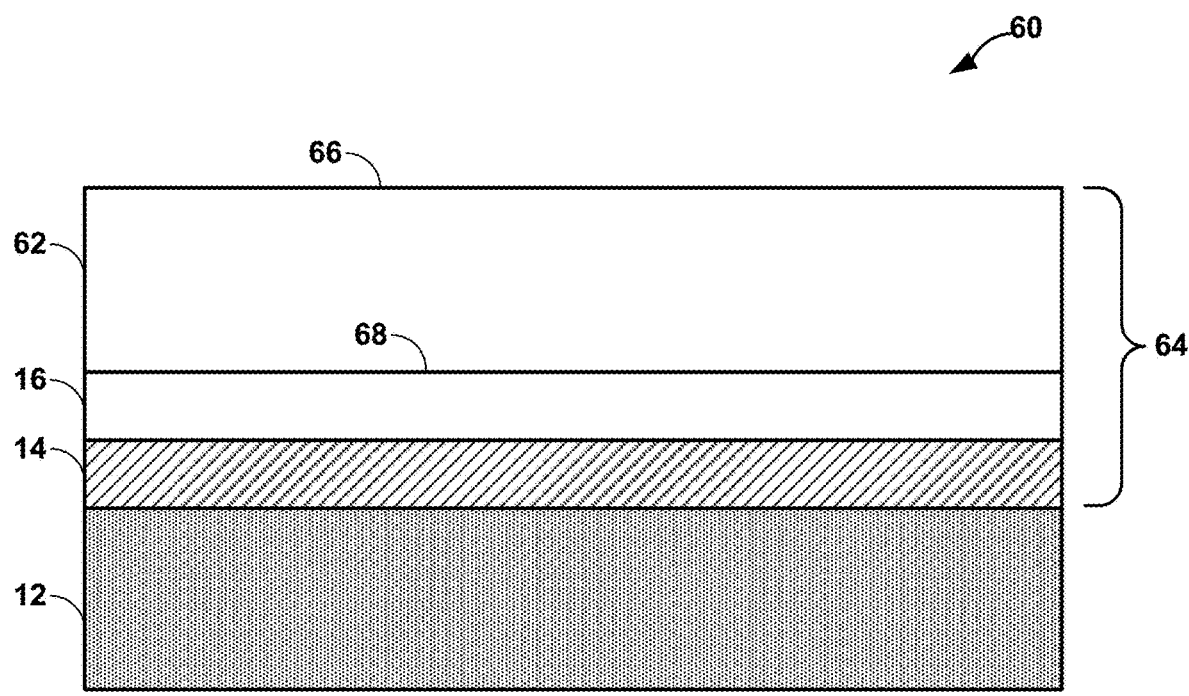

Example coating system architectures are shown in FIGS. 4-6. As will be described with regard to FIG. 4, EBC layer(s) and/or abradable layer(s) on a silica-rich RE disilicate barrier coating layer may be comprised of a stoichiometric RE disilicate or a $SiO_2$-lean ($SiO_2$ content of less than 66.6 mol %) RE disilicate (e.g., disilicate+monosilicate mixture). An abradable coating may be applied on top of the silica-rich RE disilicate barrier coating layer and one or more EBC layers, e.g., based on the requirements of a component. Components that do not require an abradable coating may have one or more EBC layers as a top coat on the silica-rich RE disilicate barrier coating layer. When EBC layer(s) are the top coat, the EBC layer(s) may be comprised of stoichiometric RE monosilicate or disilicate, or a $SiO_2$-lean RE monosilicate or disilicate. As will be described with regard to FIG. 6, in some examples, coating layer(s) applied on top of the silica-rich RE disilicate barrier coating layer may include a graded chemistry and/or porosity. For example, the chemistry of an overlaying layer may be RE disilicate material with increasing amounts of RE monosilicate as you move away from the silica-rich RE disilicate barrier coating layer towards the top of the overlaying layer. In some examples, the EBC and/or abradable coating layers overlaying the silica-rich RE disilicate barrier coating layer may also be comprised of multiple/mixed RE mono/disilicates (e.g. $(Yb_{0.5} Y_{0.5})_2 SiO_5$ or $(Yb_{0.5} Y_{0.5})_2$—$Si_2O_7$) instead of a mono/disilicate with a single RE cation.

FIG. 1 is a conceptual cross-sectional view of an example article 10 including an example coating system 18 on a substrate 12. Coating system 18 includes silica-rich RE disilicate barrier coating 16 and optional bond coating 14 between barrier coating 16 and substrate 12. Article 10 may be representative of a high-temperature component, for example, an industrial, automotive, or aeronautical component. In some examples, the component includes a gas turbine engine component, or the like.

Substrate 12 may include a material suitable for use in a high-temperature environment. In some examples, substrate 12 may include a ceramic or a ceramic matrix composite (CMC). Suitable ceramic materials, may include, for example, a silicon-containing ceramic, such as silica ($SiO_2$) and/or silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples in which substrate 12 includes a ceramic, the ceramic may be substantially homogeneous.

In examples in which substrate 12 includes a CMC, substrate 12 may include a matrix material and a reinforcement material. The matrix material may include, for example, silicon metal or a ceramic material, such as silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or another ceramic material. The CMC may further include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like.

Substrate 12 may be manufactured using one or more techniques including, for example, chemical vapor deposition (CVD), chemical vapor infiltration (CVI), polymer impregnation and pyrolysis (PIP), slurry infiltration, melt infiltration (MI), combinations thereof, or other techniques.

As illustrated in FIG. 1, optional bond coat 14 of coating system 18 is on substrate 12. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, e.g., there are no intermediate layers or coatings. In some examples, as shown in FIG. 1, bond coat 14 of coating system 18 may be directly on substrate 12. In other examples, one or more coatings or layers of coatings may be between bond coat 14 of coating system 18 and substrate 12. In some examples, coating system 18 may not include bond coat 14, e.g., in cases in which article 10 is configured to operate in a relatively high temperature environment where a silicon bond coat may not be desirable because of the high temperature.

Bond coat 14 may be between barrier coating 16 and substrate 12 and may increase the adhesion of barrier coating 16 to substrate 12. In some examples, bond coat 14 may include silicon and take the form of a silicon bond layer. Bond coat 14 may be in direct contact with substrate 12 and barrier coating 16. In some examples, bond coat 14 has a thickness of approximately 25 microns to approximately 250 microns, although other thicknesses are contemplated.

In examples in which substrate 12 includes a ceramic or CMC, bond coat 14 may include a ceramic or another material that is compatible with the material from which substrate 12 is formed. For example, bond coat 14 may include mullite (aluminum silicate, $Al_6Si_2O_{13}$), silicon metal or alloy, silica, a silicide, or the like. Bond coat 14 may further include other elements, such as a rare earth silicate including a silicate of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), and/or scandium (Sc).

The composition of bond coat 14 may be selected based on the chemical composition and/or phase constitution of substrate 12 and the overlying layer (e.g., barrier coating 16 of FIG. 1). For example, if substrate 12 includes a ceramic or a CMC, bond coat 14 may include silicon metal or alloy or a ceramic, such as, for example, mullite.

In some cases, bond coat 14 may include multiple layers. For example, in some examples in which substrate 12 includes a CMC including silicon carbide, bond coat 14 may include a layer of silicon on substrate 12 and a layer of mullite, a rare earth silicate, or a mullite/rare earth silicate dual layer on the layer of silicon. In some examples, a bond coat 14 including multiple layers may provide multiple functions of bond coat 14, such as, for example, adhesion of substrate 12 to an overlying layer (e.g., barrier coating 16 of FIG. 1), chemical compatibility of bond coat 14 with each of substrate 12 and the overlying layer, a better coefficient of thermal expansion match of adjacent layers, or the like.

Bond coat 14 may be applied on substrate 12 using, for example, thermal spraying, e.g., air plasma spraying, high velocity oxy-fuel (HVOF) spraying, low vapor plasma spraying, suspension plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

Coating system 18 of article 10 also includes barrier coating 16. Barrier coating 16 may be configured to reduce the transport of oxidants (e.g., water vapor and/or oxygen) from the outside environment to reduce the formation of TGO on substrate 12 and/or bond coat 14, e.g., as a result of a reaction of the oxidants with silicon in substrate 12 and/or bond coat 14.

In some example, barrier coating 16 may be formed by the deposition (e.g., via thermal spraying) of a silica-rich (greater than 66.6 mol % $SiO_2$) RE disilicate material and one or more additional materials. The RE element in the silica-rich RE disilicate may include at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc). The deposited RE disilicate material may be a single RE cation material. In some examples, the RE disilicate may be a ytterbium disilicate.

The deposited silica-rich RE disilicate may include greater than 66.6 mol % $SiO_2$, such as about 66.6 mol % to about 85 mol % $SiO_2$. In some examples, the mol % $SiO_2$ may be selected based on the chemistry and amount of additional material (dopant/additive) that is selected. Maintaining a coefficient of thermal expansion (CTE) less than or equal to about 6.5 ppm/K may be needed for a reasonable CTE match to the substrate and/or bond coat (CTE of about 3.5-5 ppm/K). If a certain amount of additional material is needed for increased hermeticity however it may increase the CTE to greater than 6.5 ppm/K then more $SiO_2$-rich disilicate may be needed to bring the CTE back down so that the CTE of the barrier coating is a good match to the substrate and/or bond coat. In some examples, excess $SiO_2$ from the silica-rich RE disilicate may be present at grain boundaries and/or intersplat boundaries.

Figure 2:
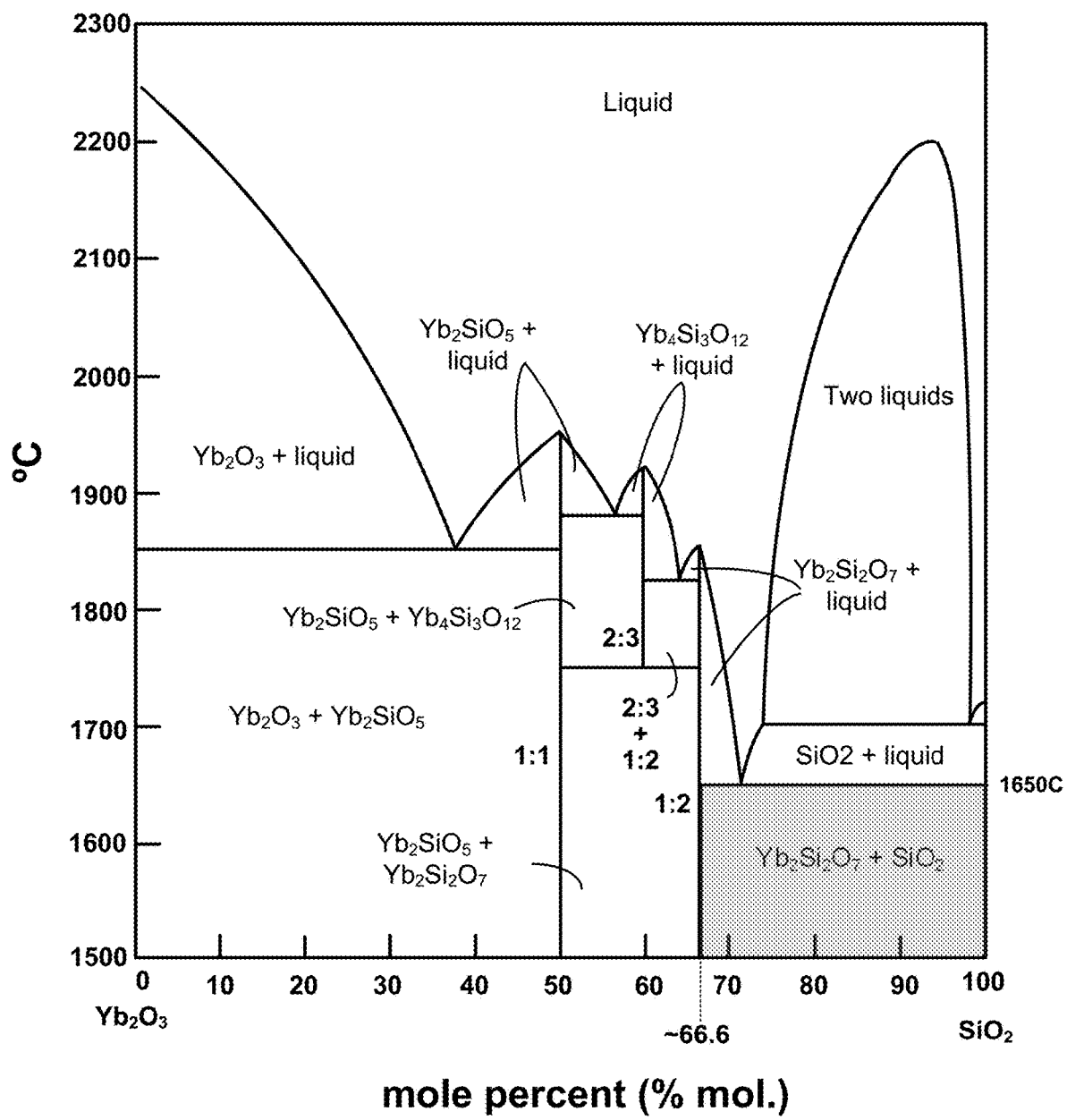
FIG. 2 is a chart illustrating a phase diagram of an ytterbia-silica system.
Figure 3:
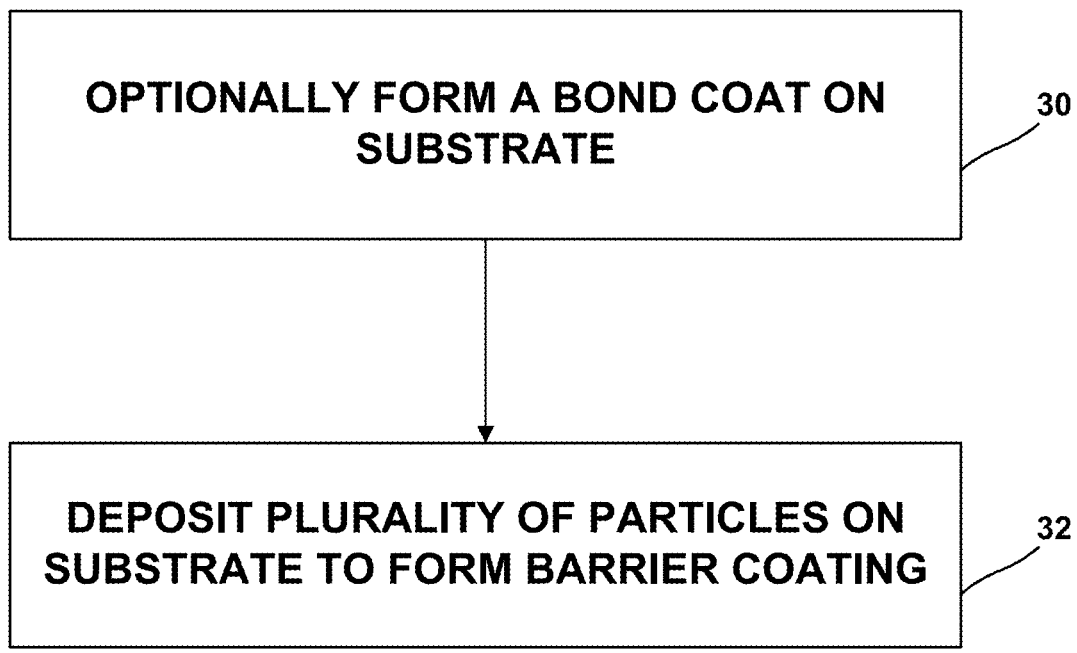
FIG. 3 is a flow diagram illustrating an example technique for forming a barrier coating in accordance with this disclosure.

FIG. 2 is a chart illustrating a phase diagram of an ytterbia (ytterbium oxide)-silica (silicon oxide) system. As seen in the phase diagram of FIG. 2, the shaded portion represents an silica-rich RE disilicate phase containing $Yb_2Si_2O_7$+ silica ($SiO_2$). A silica rich phase is a phase having greater than 66.6 mol % $SiO_2$ and balance mol. % $Yb_2O_3$.

The one or more additional materials in the deposited material may be a dopant or an additive and may include one or more of $Al_2O_3$, $Fe_2O_3$, $Fe_3O_4$, $RE_2O_3$, mullite, a $RE_3Al_5O_{12}$, CaO, or MgO. As described herein, the one or more additional materials deposited with the silica-rich RE disilicate material may be configured to interact (e.g., react) with all or a portion of the excess silica to form one or more additional phases in barrier coating 16. The one or more additional phases may be an amorphous or crystalline phase, e.g., that has relatively low oxidant transport properties. In some examples, the additional material(s) may react with silica to form a glassy phase. As described herein, the one or more additional phases may form or may otherwise be located along grain boundaries and/or splat boundaries in barrier coating 16. In this manner, the intergranular and/or intersplat phases may reduce the transport of oxidants through barrier coating 16 along the granular boundary and/or splat boundary fast transport pathways. In some examples, barrier coating 16 may have a relatively low permeability to oxidants such as water vapor or oxygen that result in the formation of TGO under barrier coating 16. In some examples, the permeability of barrier coating 16 to oxidants may be less than one or more layers overlying barrier coating 16, e.g., such as EBC layers 42 and 44 and abradable layer 46 described below. In some examples, the permeability may be such that the transport of oxidants through the barrier coating is reduced which results in a reduction in TGO thickness, e.g., by a factor of 1.5 or greater (e.g. TGO reduces from 10 microns to 6.67 microns). In some examples, a factor of 10 reduction may be achieved.

Additionally, or alternatively, the one or more additional materials may function as a sintering aid to decrease the density of barrier coating 16, e.g., by decreasing the porosity of barrier coating 16 (e.g., as compared to the density and/or porosity of a similar barrier coat deposited without the additional material(s) as a sintering aid). In some examples, the density of barrier coating 16 may be greater than that of one or more layers overlying barrier coating 16, e.g., such as EBC layers 42 and 44 and abradable layer 46 described below. In some examples, barrier coating 16 may have a porosity of less than about 10% such as about 0.1% to about 10%. In some examples, the porosity of barrier coating 16 may be less than one or more layers overlying barrier coating 16, e.g., such as EBC layers 42 and 44 and abradable layer 46 described below. Other densities and porosities for barrier coating 16 are contemplated.

Additionally, or alternatively, one or more cation species from the one or more additional materials (e.g., $Al_2O_3$ and/or other additional material) may be configured to incorporate into a TGO layer formed, e.g., between bond coat 14 and barrier coating 16 or between substrate 12 and barrier coating 16. The incorporation of the one or more cation species from the one or more additional materials may modify the chemistry and/or structure of the TGO layer to make the TGO layer less permeable to oxidants. In some examples, the modification influences the rate at which oxidants transport through the TGO layer and, thus, modifies the growth rate of the TGO. For example, the modification may reduce the permeability of the TGO to oxidants thus reducing the growth rate of the TGO layer.

Additionally, or alternatively, one or more of the additional material(s) deposited to form barrier coating 16 may be incorporated into a TGO layer underlying the barrier coating 16 to improve the rate at which amorphous TGO transition into crystalline TGO. For example, the one or more of the additional material(s) may be configured to be incorporated into the TGO layer to decrease the rate at which the TGO transitions from an amorphous phase to an crystalline phase, e.g., as compared to the rate at which the TGO would transition from an amorphous phase to an crystalline phase without the incorporation of the one or more additional materials. In some example, it is not desirable to crystallize the TGO to cristobalite because there is β to α-cristobalite transformation that occurs at about 220° C. This transformation results in an about 5% volume decrease which may crack the TGO. Cracking of the TGO may eventually lead to the spallation of the coating. More details may be described in "Local thermal conductivity measurement to determine the fraction of α-cristobalite in thermally grown oxide for aerospace applications" by Olson et al., Scripta Materialia 177 (2020) 214-217, the entire content of which is incorporated herein by reference.

As shown in the example of FIG. 1, barrier coating 16 may include a first domain 20 formed of a plurality of subdomains such as subdomains 20a and 20b. In some examples, first domain 20 may include a granular structure such as represented in subdomain 20b. The granular structure may include one or more grains such as grain 24 defining grain boundaries such as grain boundary 26. The grains 24 of first domain 20 may be single grains (has one orientation). Barrier coating 16 as a whole may be polycrystalline having many grains of different orientations. For ease of illustration, only subdomain 20b is shown with a granular structure although it is recognized that all or a portion of first domain 20 may have granular structure.

First domain 20 may additionally or alternatively have splat boundaries within coating 16, such as splat boundary 22. Splat boundary 22 may form as a result of a thermal spray deposition process such as that described herein. The material within splat boundary 22 may correspond to individual particles and/or a plurality of particles of a material deposited by thermal spraying which deforms upon impact during a thermal spray deposition process. While the splat boundaries 22 of barrier coating 14 are shown to divide first domain 20 into sub sections which may include multiple grains, in other examples, the boundaries of a single grain 24 may also define a splat boundary. Accordingly, barrier coating 16 may include first domain 20 having grain boundaries 26 and/or splat boundaries 22.

In some examples, for a thermal sprayed coating, the feedstock material is melted and deposited on substrate 12. When the molten material hits substrate 12, it forms a splat such that barrier coating 16 is formed by building up a plurality of splats. Between each splat there may be a splat boundary. Each splat may be comprised of multiple grains which has grain boundaries in between them.

In some examples, first domain 20 may be a matrix comprising, consisting of, or consisting essentially of the RE disilicate material from the deposited silica-rich RE disilicate material. First domain 20 may also include at least a portion of the excess silica from the deposited silica-rich RE disilicate material, e.g., such that first domain 20 comprises, consists, or consists essentially of a RE disilicate material with excess silica compared to stoichiometric RE disilicate (greater than 66.6 mol % $SiO_2$). In some examples, the additional material(s) deposited with the silica-rich RE disilicate may interact (e.g., react) with all or a portion of the excess silica from the deposited silica-rich RE disilicate to form one or more additional phases within barrier coating 16. Additionally, or alternatively, the additional material(s) deposited with the silica-rich RE disilicate may interact (e.g., react) with RE disilicate from the deposited silica-rich RE disilicate to form one or more additional phases within barrier coating 16. The one or more additional phases may form or may otherwise be located along grain boundaries 26 and/or splat boundaries 22 of barrier coating 16. As one example, with the additional material comprising alumina, first domain 20 may include a RE disilicate phase with an additional aluminosilicate phase along all or a portion of grain boundaries 26 and/or splat boundaries 22. As noted above, grain boundaries 26 and/or splat boundaries 22 may be fast transport pathways through a coating. The presence of one or more additional phases as grain boundaries 26 and/or splat boundaries 22 may increase the hermeticity of barrier coating 16 by blocking or otherwise slowing the transport of oxidants along grain boundaries 26 and/or splat boundaries 22 of barrier coating 16.

In some example, first domain 20 may be a RE disilicate matrix that may or may not also include excess silica from the silica rich RE disilicate material. The excess $SiO_2$ could be a separate phase or may be in solid solution with RE disilicate (e.g., incorporated into the structure of the disilicate and is one single phase). In some examples, there may also be some small amount of RE monosilicate in the coating from $SiO_2$ loss during thermal spraying. The amount of RE monosilicate may range from 0 vol. % to about 10 vol. %, such as about greater than 0 vol. % to about 10 vol. % or greater than 0 vol. % to about 5 vol. %.

Barrier coating 16 may predominantly include the material of first domain 20, e.g., with the remainder being the one or more additional phases along grain boundaries 26 and/or splat boundaries 26. In some examples, barrier coating 16 includes at least about 50 vol. % RE disilicate material, such as, about 50 vol. % to about 99 vol. % RE disilicate material. In some examples, the RE disilicate material of first domain 20 may include all or a portion of the excess silica from the deposited silica-rich RE disilicate material used to form barrier coating 16.

In addition to a RE disilicate, barrier coating 16 may include one or more additional phases as described herein. The total number of additional phases present may depend on the additional materials selected for deposition to form barrier coating 16. In some examples, barrier coating 16 may include at least about 1 vol. % of the one or more additional phases, e.g., that results from the interaction of the one or more additional materials deposited with the silica-rich RE disilicate with silica (the excess silica) and/or RE disilicate, and/or other additional materials to form barrier coating 16, such as, about a 1 vol. % to about 30 vol. %. As describe herein, the one or more additional phases may be an intergranular phase and/or intersplat phase.

FIG. 2 is a flow diagram illustrating an example technique for forming a barrier coating in accordance with this disclosure. While the example technique of FIG. 2 is described with reference to article 10 of FIG. 1, the example technique of FIG. 2 may be used to prepare any example articles according to the disclosure.

The example technique of FIG. 2 optionally includes forming bond coat 14 on substrate 12 of article 10 (30). Forming bond coat 14 may include vapor deposition, spraying, or any suitable technique. The bond coat may include at least one metal, metalloid, alloy, ceramics, and mixtures or combinations thereof. In some examples, the bond coat includes elemental silicon. The bond coat may promote bonding or retention of subsequently deposited or applied layers, for example, barrier coatings, on substrate 12.

The example technique of FIG. 2 includes depositing a plurality of particles on substrate 12 to form barrier coating 16 (32). The deposition (32) may be performed directly on a surface defined by substrate 12, or on an intermediate layer or coating on substrate 12, for example, on bond coat 14. The plurality of particles may include a silica-rich RE disilicate material and one or more additional materials (e.g., in the form of dopants and/or additives). As described herein, the silica-rich RE disilicate material may include excess silica compared to a stoichiometric RE disilicate material. In some examples, the plurality of particle may include the combination of silica-rich RE disilicate particles and particles of the one or more additional materials. Additionally, alternatively, individual particles of the plurality of particles may include both the silica-rich RE disilicate material and the one or more additional materials. For example, the particles may include core shell particles in which the core of the particles is formed of the silica-rich RE disilicate material and the shell is formed of the one or more additional materials, or vice versa. In some examples, the particles may be pre-alloyed, e.g., with the additional material and the silica-rich RE disilicate being pre-reacted, and/or may be a mixture containing separate particles of hyper-RE disilicate and the additional material, and/or may be the individual material powders co-sprayed with each other (e.g., where the individual material powders are fed into the thermal spray torch separately and mix in the thermal spray torch/plasma).

In some examples, the deposited material (e.g., as a pre-alloyed powder, a mixture of powders, or other state described above) may include a silica-rich RE disilicate with the additional material(s) ranging from, e.g., about 0.5 to about 25 mol %.

Depositing the plurality of particles (32) may include one or more of vapor deposition (EB-PVD, DVD), chemical vapor deposition (CVD), slurry deposition, sol-gel deposition, tape casting, electrophoretic deposition, or thermal spraying. Thermal spraying may include, e.g., air plasma spraying (APS), suspension plasma spraying (SPS), high velocity oxygen fuel (HVOF) spraying, low pressure plasma spraying (LPPS), very low pressure plasma spraying (VLLPS), and plasma spray-physical vapor deposition (PS-PVD). A slurry may be deposited using painting, dip coating, spraying, or the like, followed by drying and sintering. The slurry particles may include the desired composition of the final coating, and/or may include precursors, such as Si-rich RE disilicate particles and particles of the one or more additional materials, that react during a sintering process to form the coating with a desired composition.

In some examples, a suspension plasma spray process may be used. The suspension plasma spray process may be a plasma spraying process where the feedstock is dispersed in a liquid suspension before being injected into the plasma jet and deposited on substrate 12. Example liquids for use in the suspension may include water or alcohol (e.g., methyl alcohol).

In some examples, in examples in which particles of different compositions are employed, the deposited particles (e.g., in the form of powders) may be blended or otherwise combined in a predetermined ratio before spraying or slurry coating the blend.

In some examples, first domain 20 of barrier coating 16 may be formed from "splats" of silica-rich RE disilicate particles deposited using thermal spraying. In other examples, first domain 20 may be formed from fine particulates of silica-rich RE disilicate powder deposited using thermal spraying, e.g., by mixing ball-milled RE disilicate powder with silica powder (and optionally powder of the one or more additional materials) and depositing the mixture using vapor deposition or thermal spraying. Similarly, by selecting powder size and morphology used to form a slurry, the resulting microstructure of the coating may be controlled.

In some examples, for a thermal spray coating, the thermal spray parameters may be changed to control the microstructure of barrier coating 16 and/or the amount of $SiO_2$ loss during spraying. Reaction between the additional material and silica-rich RE disilicate may not occur during the thermal spray process. For the thermal spray of a silica-rich RE disilicate and dopants/additives, all the material may be deposited, which mixes together to some extent in an amorphous containing (e.g., about 20 vol. % to about 80 vol. % amorphous and/or about 25 vol. % to about 95 vol. % crystallinity) as-deposited coating. The separate phases may be identified after spraying but are typically are not in a state of equilibrium. Once the coating is heated to high temperature (e.g., about 700° C. to about 1600° C.) after deposition either by a prescribed heat treatment or in the engine the coating will crystallize, sinter (densify), and react and/or precipitate out equilibrium phases at the intergranular and/or intersplat boundaries as described herein.

In the example of FIG. 1, coating system 18 includes barrier coating 16 as the top coat without any additional overlaying layers. As noted above, while barrier coating 16 may reduce the transport of oxidants from the external environment to underlying bond coat 14 and/or substrate 12, the stability of a silica-rich RE disilicate barrier coating in high velocity water vapor may be poor. In some examples, a coating system including a silica-rich RE disilicate barrier coating may also include one or more additional layers.

FIG. 4 is a schematic diagram illustrating an example article 40 including coating system 48 on substrate 12. Coating system 48 includes bond coating 14 and silica-rich RE disilicate barrier coating 16, which may be the same as described for coating system 18 of article 10 shown in FIG. 1. In addition to bond coating 14 and silica-rich RE disilicate barrier coating 16, coating system 18 includes first EBC layer 42, second EBC layer 44, and abradable coating 46 formed on barrier coating 16. First EBC layer 42, second EBC layer 44, and/or abradable coating 46 may help protect underlying substrate 12 from chemical species present in the environment in which article 40 is used, such as, e.g., water vapor, Calcium-Magnesium-Alumino-Silicate (CMAS; a contaminant that may be present in intake gases of gas turbine engines), or the like. For example, first EBC layer 42, second EBC layer 44, and/or abradable coating 46 may be configured to help protect substrate 12, bond coat 14, and/or barrier coating 16 against deleterious environmental species, such as CMAS and/or water vapor. While the example coating system 48 include two EBC layers 42 and 44, it is contemplated that coating system 48 may also include a single EBC layer or more than two EBC layers. Furthermore, for articles that do not require an abradable coating, a coating system may include an EBC layer, such as, first EBC 42 or second EBC 44, as the topcoat.

Abradable coating 46 may be configured such that the outer surface of abradable coating 46 is abraded, e.g., when brought into contact with an opposing surface such as a blade tip. For example, abradable coating 46 may have a greater porosity than first EBC layer 42 and/or second EBC layer 44, and the porosity of abradable coating 46 may be provided such that the outer surface of abradable coating 46 is abraded, e.g., when brought into contact with an opposing surface such as a blade tip.

First EBC layer 42, second EBC layer 44, and/or abradable coating 46 may each include at least one of a rare-earth oxide, a rare-earth silicate, an aluminosilicate, or an alkaline earth aluminosilicate. For example, first EBC layer 42, second EBC layer 44, and/or abradable coating 46 may each include mullite, barium strontium aluminosilicate (BSAS), barium aluminosilicate (BAS), strontium aluminosilicate (SAS), at least one rare-earth oxide, at least one rare-earth monosilicate ($RE_2SiO_5$, where RE is a rare-earth element), at least one rare-earth disilicate ($RE_2Si_2O_7$, where RE is a rare-earth element), or combinations thereof. The rare-earth element in the at least one rare-earth oxide, the at least one rare-earth monosilicate, or the at least one rare-earth disilicate may include at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc). In some examples, first EBC layer 42, second EBC layer 44, and/or abradable coating 46 may include a stoichiometric RE disilicate or a silicate-lean RE disilicate material (e.g., disilicate+monosilicate mixture).

First EBC layer 42, second EBC layer 44, and/or abradable coating 46 may be any suitable thickness. For example, first EBC layer 42 and/or second EBC layer 44 may be about 0.003 inches (about 76 micrometers) to about 0.100 inches (about 2540 micrometers). In some examples, first EBC layer 42 and/or second EBC layer 44 may have a thickness of about 0.001 inches (about 25.4 micrometers) to about 0.01 inches (about 254 micrometers). In other examples, first EBC layer 42 and/or second EBC layer 44 may have a different thickness than such values, and first EBC layer 42 and second EBC layer 44 may have substantially the same or different thicknesses. Abradable coating 46 may be about 0.005 inches (about 127 micrometers) to about 0.100 inches (about 2540 micrometers) thick. Other thicknesses for abradable coating 46 are contemplated.

First EBC layer 42, second EBC layer 44, and/or abradable coating 46 may have a porosity. In some examples, first EBC layer 42 and/or second EBC layer 44 may have porosity of more than about 1 vol. %, such as about 1 vol. % to about 20 vol. %, where porosity is measured as a percentage of pore volume divided by total volume of the respective EBC layer. Abradable coating 46 may have a porosity of more than about 15 vol. %, such as more than about 25 vol. %, more than 35 vol. %, or about 25 vol. % to about 45 vol. %, where porosity is measured as a percentage of pore volume divided by total volume of abradable coating 46. The porosity of first EBC layer 42, second EBC layer 44, and abradable coating 46 may be measured using mercury porosimetry, optical microscopy or Archimedean method. The porosity of the barrier layer 16 may also be measured using such techniques.

In some examples, the properties (e.g., composition, thickness, and/or porosity) of first EBC layer 42 and second EBC layer 44 may be different. For example, each EBC may contain different amounts of porosity, RE monosilicate, and/or other dopants. All of these factors may affect the CTE and/or overall compliance of the coating system. Increased monosilicate may be present for increased water vapor and CMAS resistance. Porosity may increase the compliance (reduce stresses) between each layer. Dopants may be present for improved environmental resistance (e.g. CMAS, water vapor).

The properties of EBC layer 42 and EBC layer 44 may be tailored to have sufficient environmental resistance to protect barrier layer 16 from water vapor, CMAS, and the like, and to have a good CTE match (e.g., within 1.5 ppm/K of the adjacent layer), which may be varied by varying the amount of monosilicate and porosity of the respective layer.

While the example of FIG. 4 illustrates an example in which multiple layers are present on barrier coating 16, in other examples only a single layer (e.g., a single EBC layer such as EBC layer 42 or EBC layer 44 or single abradable layer such as layer 46) may be present on barrier coating 16. Such a single layer example may be employed for example for a coating on a vane or blade. In one example, EBC layer 42 and EBC layer 44 may be present on barrier coating 16 without abradable layer 46 and barrier coating 16 may or may not be on optional bond coat 14. As described further below, in some example, one or more EBC layers such as EBC layer 42 and/or EBC layer 44 may be between substrate 12 and barrier coating 16 (e.g., with EBC layer 42 or EBC layer 44 being on bond coat 14 or directly on substrate 12 with barrier coating 16 being on EBC layer 42 or EBC layer 44). Example of the disclosure include configurations in which barrier coating 16 is adjacent to the substrate 12/optional bond coat 14 with an EBC layer(s) (e.g., EBC layers 42,44) on top of barrier coating 16 or there may be EBC layer(s) adjacent to the substrate 12/optional bond coat 14 and the barrier coating 16 can be on top of the EBC layer(s) with an additional EBC layer(s) above the barrier coating 16.

In some examples, the porosity of EBC layers 42, 44 and abradable coating 46 may be created and/or controlled by plasma spraying the coating material using a co-spray process technique in which the coating material and a coating material additive are fed into a plasma stream with two radial powder feed injection ports. The feed pressures and flow rates of the coating material and coating material additive may be adjusted to inject the material on the outer edge of the plasma plume using direct 90-degree angle injection. This may permit the coating material particles to soften but not completely melt, and the coating material additive to not burn off, but rather soften sufficiently for adherence within coating 16.

In other examples, the porosity of EBC layers 42, 44 and abradable coating 46 may be controlled by the use of coating material additives and/or processing techniques to create the desired porosity. For example, to form an abradable layer such as abradable coating 46, a fugitive material that melts or burns at the use temperatures of the component (e.g., a blade track) may be incorporated into the coating material that forms abradable coating 46. The fugitive material may include, for example, graphite, hexagonal boron nitride, or a polymer such as a polyester, and may be incorporated into the coating material prior to deposition of the coating material on substrate 12 to form abradable coating 46. The fugitive material then may be melted or burned off in a post-formation heat treatment, or during operation of the gas turbine engine, to form pores in abradable coating 46. The post-deposition heat-treatment may be performed at up to about 1500° C. for a component having a substrate 12 that includes a CMC or other ceramic.

In other examples, the porosity of EBC layers 42, 44 and abradable coating 46 may be created or controlled in a different manner, and/or EBC layers 42, 44 and abradable coating 46 may be deposited on substrate 12 using a different technique. For example, EBC layers 42, 44 and abradable coating 46 may be deposited using a wide variety of coating techniques, including, for example, a thermal spraying technique such as plasma spraying or suspension plasma spraying, physical vapor deposition (PVD) such as EB-PVD (electron beam physical vapor deposition) or DVD (directed vapor deposition), cathodic arc deposition, slurry process deposition, sol-gel process deposition, or combinations thereof.

In some examples, barrier coating 16 may have a CTE that is relatively close to that of substrate 12 and/or bond coat 14, e.g., as compared to that of EBC layers 42 and 44, and/or abradable layer 46. For example, barrier coating 16 may have a CTE within about 2 ppm/K of the CTE of bond coat 14 and/or substrate 12. In this manner, barrier coating 16 may adhere better to substrate 12 and/or bond coat 14 compared to that of EBC layers 42 and 44, and/or abradable layer 46.

FIG. 5 is a schematic diagram illustrating another example article 50 including coating system 52 on substrate 12. Coating system 52 may be similar to coating system 48 of FIG. 4, and similar features are similarly numbered. Although not shown, coating system 52 may include an abradable coating such as abradable coating 46, e.g., as a topcoat, when article 50 is to be used in an abradable system during operation.

Unlike that of coating system 48, coating system 52 includes first EBC 42 between optional bond coating 14/substrate 12 and silica-rich barrier coating 16. In such examples, first EBC 42 may be configured to prevent incorporation of one or more of the additional material(s) from barrier coating 16 into a TGO layer that forms on bond coating 14 and/or substrate 12. In some examples, the incorporation of additive material(s) in barrier coating 16 (e.g., via diffusion) into a TGO layer that forms on bond coating 14 and/or substrate 12 may be undesirable. For example, one or more of the additional materials in barrier coating 16 described above may accelerate the transition of the TGO material from amorphous to crystalline phase, e.g., rather than delaying such a transition. In such example, first EBC layer 42 may be configured to prevent or otherwise reduce the transport of such additional material(s) from barrier layer 16 into a TGO layer formed on bond coating 14 and/or substrate 12.

In the example of FIG. 5, while the layer 42 between the barrier coating 16 and bond layer 14/substrate 12 (and TGO layer on bond coating 14/substrate 12) is described as an EBC layer, layer 42 may configured as a barrier layer that limits the diffusion of additional material(s) from barrier coating 16 into the underlaying TGO layer. The particular composition and other properties for the barrier layer 42 may depend on the particular additional material(s) used for barrier layer 16. In some examples, layer 42 may have a thickness of about 0.001 inches to about 0.02 inches although other values are contemplated. The additional barrier layer 42 may prevent or otherwise reduce the incorporation of the additional material(s) into the TGO structure to prevent or otherwise reduce accelerated TGO growth and/or the transition of the TGO layer from amorphous to crystalline phase.

In some examples, coating system 52 may include an EBC layer such as EBC layer 44 between barrier coating 16 and abradable layer 46.

FIG. 6 is a schematic diagram illustrating another example article 60 including coating system 64 on substrate 12. Coating system 64 includes optional bond coat 14 and silica-rich RE disilicate barrier coating 16 on substrate 12, all of which may be the same or substantially similar to that described above for articles 10, 40, and/or 50.

However, unlike article 40, for example, coating system 64 includes abradable EBC layer 62 on silica-rich ER disilicate barrier coating 16 rather than first EBC layer 42, second EBC layer 44, and abradable coating 46. In some examples, abradable EBC layer 62 may have a graded composition and/or graded porosity, e.g., along the thickness of layer 62. For example, the porosity of abradable EBC layer 62 may be graded such that the porosity decreases moving from top surface 66 of layer 62 to top surface 68 of barrier coating 68. In some examples, layer 62 may exhibit a relatively high porosity near top surface 66 like that described for abradable coating 46 of coating system 48 and a lower porosity adjacent to top surface 68 like that described for first EBC layer 42 of coating system 48. In this manner, the upper portion of layer 68 may still function as an abradable layer and the lower portion of layer 68 may provide better environment protection for coating system 64 and/or substrate 12 as a result of the lower porosity.

Additionally, or alternatively, layer 62 may be compositionally graded, e.g., with varying amounts of RE disilicate and RE monosilicate along the thickness of layer 62. For example, relatively low amounts of RE monosilicate may be present at interface 68 between hermetic coating 16 and layer 62. The RE monosilicate may increase from interface 68 to the surface 66 of layer 62. The monosilicate grading may be selected so there is a good CTE match at the interface 68 between barrier coating 16 and layer 62, and/or increase the monosilicate going towards the surface 66 for better water vapor and CMAS resistance.

Various examples have been described. These and other examples are within the scope of the following clauses and claims.

Clause 1. A method comprising: depositing a plurality of particles on a ceramic or ceramic matrix composite (CMC) substrate to form a barrier coating on the ceramic or CMC substrate, the plurality of particles including a silica-rich rare earth (RE) disilicate material and a second material, wherein the silica-rich RE disilicate material includes excess silica compared to a stoichiometric RE disilicate material, wherein the barrier coating includes a first domain including the silica-rich RE disilicate material and a second phase, the second phase being disposed at grain boundaries, splat boundaries, or both of the barrier coating.

Clause 2. The method of clause 1, wherein the second phase is formed by interaction of the second material with at least a portion of the excess silica of the silica-rich RE disilicate material.

Clause 3. The method of one of clauses 1 or 2, wherein the second material functions as a sintering aid to increase a density of the barrier coating compared to a coating formed by depositing the silica-rich RE disilicate material without the second material.

Clause 4. The method of any one of clauses 1-3, wherein the barrier coating comprises predominantly the first domain and less than about 30 vol. % of the second phase.

Clause 5. The method of any one of clauses 1-4, further comprising, prior to depositing the plurality of particles, forming a bond layer on the ceramic or CMC substrate, wherein depositing the plurality of particles comprises depositing the plurality of particles on the bond layer.

Clause 6. The method of any one of clauses 1-5, wherein a thermally grown oxide (TGO) layer is between the ceramic or CMC substrate and the barrier layer or between an optional bond layer and the barrier layer, wherein a cation from the second material is configured to be incorporated into the TGO layer to reduce a permeability of the TGO layer to oxidants compared to the TGO layer without the cation from the second material incorporated.

Clause 7. The method of any one of clauses 1-6, wherein a thermally grown oxide (TGO) layer is between the ceramic or CMC substrate and the barrier layer, wherein the second material is configured to be incorporated into the TGO layer to delay a transition of the TGO layer from an amorphous phase to a crystalline phase.

Clause 8. The method of any one of clauses 1-7, wherein the second material comprises at least one of $Al_2O_3$, $Fe_2O_3$, $Fe_3O_4$, $RE_2O_3$, mullite, a $RE_3Al_5O_{12}$, CaO, $LiREO_2$, or MgO.

Clause 9. The method of any one of clauses 1-8, wherein the deposition of the plurality of particles composition includes at least one of suspension plasma spray process using liquid suspension composition including the plurality of particles or an air plasma spray process.

Clause 10. The method of any one of clauses 1-9, further comprising forming at least one of an environmental barrier coating layer or an abradable coating on the barrier coating.

Clause 11. The method of any one of clauses 1-4 and 6-10, wherein depositing the plurality of particles on the ceramic or CMC substrate to form the barrier coating on the ceramic or CMC substrate comprises depositing the plurality of particles directly on the ceramic or CMC substrate to form the barrier coating directly on the ceramic or CMC substrate.

Clause 12. The method of any one of clauses 1-10, further comprising, prior to depositing the plurality of particles, forming an EBC layer on the ceramic or CMC substrate.

Clause 13. The method of any one of clauses 1-12, wherein the second phase includes a silicate phase formed by reaction of the second material with a least a portion of the excess silica.

Clause 14. The method of any one of clause 1-13, wherein the plurality of particles includes a first plurality of silica-rich rare earth (RE) disilicate particles and a second plurality of particles including the second material.

Clause 15. The method of any one of clauses 1-13, wherein the plurality of particles includes a plurality of core shell particles, the core shell particles including a core including the silica-rich rare earth (RE) disilicate material and a shell including the second material.

Clause 16. The method of any one of clauses 1-15, wherein the second phase includes at least one of an amorphous phase or a crystalline phase.

Clause 17. The method of any one of clauses 1-16, wherein the plurality of particles includes a third material, wherein the barrier coating includes a third domain at the at least one of grain boundaries or splat boundaries of the barrier coating, the third domain including a phase formed by interaction of the third material with at least a portion of the excess silica of the silica-rich RE disilicate material.

Clause 18. The method of any one of clauses 1-17, wherein the silica-rich RE disilicate material is a single cation RE disilicate material.

Clause 19. The method of any one of clauses 1-18, wherein the deposition of the feedstock composition includes depositing the feedstock composition via thermal spray process.

Clause 20. The method of any one of clauses 1-19, wherein the second phase is formed by interaction of the second material with RE disilicate of the silica-rich RE disilicate material.

Clause 21. The method of any one of clauses 1-20, wherein the plurality of particles includes at least one of a plurality of core shell particles, pre-alloyed particles, or mixture of individual material particles including the silica-rich rare earth (RE) disilicate material and the second material.

Clause 22. The method of any one of clauses 1-21, wherein depositing the plurality of particles comprising thermal spraying the plurality of particles to form an as-deposited barrier coating, the as-deposited barrier coating having a crystallinity of about 25 vol. % to about 95 vol. %.

Clause 23. An article comprising: a ceramic or ceramic matrix composite (CMC) substrate; and a barrier coating on the substrate, the barrier coating comprising: a first domain including a rare earth (RE) disilicate material and excess silica compared to a stoichiometric RE disilicate, and a second phase formed by interaction of a second material with at least a portion of the excess silica, wherein the second phase is disposed at grain boundaries, splat boundaries, or both of the barrier coating.

Clause 24. An article comprising a coating system on a ceramic or ceramic matrix composite (CMC) substrate, the coating system in accordance with one or more of the example coating system described in the application.

Clause 24. An article formed using a method according to any one of clauses 1-22.

What is claimed is:

1. A method comprising:
depositing, via air plasma spraying, a plurality of particles directly on a silicon bond layer that is on a ceramic or ceramic matrix composite (CMC) substrate to form a silica-rich barrier coating directly on the silicon bond layer on the ceramic or CMC substrate, the plurality of particles including a silica-rich rare earth (RE) disilicate material and a second material, wherein the second material comprises $LiREO_2$, wherein the silicon bond layer is directly on the ceramic or CMC substrate and the silica-rich barrier coating is directly on the silicon bond layer,
wherein the silica-rich RE disilicate material includes excess silica compared to a stoichiometric RE disilicate material,
wherein the silica-rich barrier coating includes a first domain having a granular structure, respective grains of the granular structure including the silica-rich RE disilicate material,
wherein the silica-rich barrier coating includes a second phase, the second phase including the $LiREO_2$ and being disposed at grain boundaries defined by the granular structure of the first domain of the barrier coating, wherein the second phase includes a glassy phase formed by reaction of the $LiReO_2$ with at least a portion of the excess silica, wherein the $LiREO_2$ and the glassy phase in the silica-rich barrier coating are present in an amount to increase the hermeticity of the silica-rich barrier coating and provide oxidation protection to the silicon bond layer and/or the substrate underlying the silica-rich barrier coating,
wherein the silica-rich barrier coating comprises predominantly the first domain and less than about 30 vol. % of the second phase; and
forming an environmental barrier coating layer directly on a top surface of the silica-rich barrier coating such that a layer interface is formed between the environmental barrier coating layer and the top surface of the silica-rich barrier coating, wherein the environmental barrier coating layer includes a silicate-lean RE silicate without excess silica compared to the stoichiometric RE silicate material, wherein the environmental barrier coating layer includes RE monosilicate.

2. The method of claim 1, wherein the $LiREO_2$ functions as a sintering aid to increase a density of the silica-rich barrier coating compared to a coating formed by depositing the silica-rich RE disilicate material without the $LiREO_2$.

3. The method of claim 1, further comprising, prior to depositing the plurality of particles, depositing silicon on the ceramic or CMC substrate to form the silicon bond layer directly on the ceramic or CMC substrate, wherein depositing the plurality of particles comprises depositing the plurality of particles on the silicon bond layer.

4. The method of claim 1, wherein, following formation of the environmental barrier coating layer, a thermally grown oxide (TGO) layer is formed between the silicon bond layer and the silica-rich barrier coating, wherein a rare earth cation from the $LiREO_2$ is incorporated into the TGO layer to reduce a permeability of the TGO layer to oxidants compared to the TGO layer without the rare earth cation from the $LiREO_2$ being incorporated.

5. The method of claim 1, wherein, following formation of the environmental barrier coating layer, a thermally grown oxide (TGO) layer is formed between the ceramic or CMC substrate and the silica-rich barrier coating, wherein the $LiREO_2$ is configured to be incorporated into the TGO layer to delay a transition of the TGO layer from an amorphous phase to a crystalline phase.

6. The method of claim 1, wherein the silicate-lean RE silicate without excess silica compared to the stoichiometric RE silicate material of the environmental barrier coating comprises a first silicate-lean RE silicate without excess silica compared to a first stoichiometric RE silicate material, the method further comprising forming an abradable coating on the environmental barrier coating, wherein the abradable coating includes a second stoichiometric RE silicate or a second silicate-lean RE silicate without excess silica compared to a second stoichiometric RE silicate material.

7. The method of claim 1, wherein the plurality of particles includes pre-alloyed particles of the silica-rich RE disilicate material and $LiREO_2$ particles.

8. The method of claim 1, wherein the plurality of particles includes a plurality of core shell particles, the core shell particles including a core including the silica-rich rare earth (RE) disilicate material and a shell including the $LiREO_2$.

9. The method of claim 1, wherein the second phase includes an amorphous phase and a crystalline phase.

10. The method of claim 1, wherein the environmental barrier coating layer on the silica-rich barrier coating includes RE disilicate and the RE monosilicate, and wherein the environmental barrier coating layer is compositionally graded such that an amount of the RE monosilicate in the environmental barrier coating layer increases moving away from an interface between the silica-rich barrier layer and environmental barrier coating layer.

11. The method of claim 6, wherein the first silicate-lean RE silicate of the environmental barrier coating layer on the silica-rich barrier coating includes a multiple cation RE silicate, and wherein the silica-rich RE disilicate material is a single cation RE silicate.

12. The method of claim 1, wherein the plurality of particles are deposited such that the silica-rich barrier coating includes a plurality of splats defining splat boundaries, wherein the second phase is disposed at the splat boundaries in the silica-rich barrier coating.

13. The method of claim 1, wherein the second phases disposed at the grain boundaries reduces the transport of oxidants through the silica-rich barrier coating along the grain boundaries.

14. The method of claim 1, wherein the silica-rich barrier coating is a hermetic barrier coating.

15. The method of claim 1, wherein the silicon bond layer consists of silicon.

16. The method of claim 1, wherein the environmental barrier coating layer on the silica-rich barrier coating includes a first environmental barrier coating layer, the method further comprising forming a second environmental barrier coating layer on the first environmental barrier coating layer, wherein the second environmental barrier coating layer includes a stoichiometric RE silicate or the silicate-lean RE silicate without excess silica compared to the stoichiometric RE silicate material.

17. The method of claim 16, wherein the first environmental barrier coating layer includes at least one of a different porosity or different amount of RE monosilicate compared to the second environmental barrier coating layer.

18. The method of claim 1, further, following the formation of the silica-rich barrier coating, heat treating the silica-rich barrier coating following deposition to crystallize and sinter the coating.

19. The method of claim 1, wherein a rare earth cation from the $LiREO_2$ is incorporated into a boundary phase of the silica-rich barrier coating to reduce a permeability to oxidants compared to a silica-rich barrier coating layer without the rare earth cation from the $LiREO_2$ being incorporated.

* * * * *